(12) United States Patent
Burlingame et al.

(10) Patent No.: US 6,855,272 B2
(45) Date of Patent: Feb. 15, 2005

(54) LOW PRESSURE DROP REFORMING EXCHANGER

(75) Inventors: Robert Burlingame, Houston, TX (US); Thomas A. Czuppon, Houston, TX (US); Larry G. Hackemesser, Houston, TX (US)

(73) Assignee: Kellogg Brown & Root, Inc., Houston, TX (US)

( * ) Notice: Subject to any disclaimer, the term of this patent is extended or adjusted under 35 U.S.C. 154(b) by 379 days.

(21) Appl. No.: 09/908,307

(22) Filed: Jul. 18, 2001

(65) Prior Publication Data

US 2003/0064011 A1 Apr. 3, 2003

(51) Int. Cl.[7] .............................. C01B 3/38; B01J 8/06
(52) U.S. Cl. ...................... 252/373; 422/196; 422/197; 422/198; 422/200; 422/201; 422/205; 422/222
(58) Field of Search ................................ 422/198, 200, 422/201, 196, 197, 205, 222; 252/373

(56) References Cited

U.S. PATENT DOCUMENTS

| | | | |
|---|---|---|---|
| 4,400,309 A | | 8/1983 | McMahon et al. |
| 4,822,521 A | * | 4/1989 | Fuderer ..................... 252/373 |
| 5,011,625 A | | 4/1991 | Le Blanc |
| 5,362,454 A | | 11/1994 | Cizmer et al. |
| 5,718,881 A | | 2/1998 | Sederquist et al. |
| 5,890,868 A | | 4/1999 | Comardo |
| 5,897,282 A | | 4/1999 | Comardo |
| 5,935,889 A | | 8/1999 | Murrell et al. |
| 5,980,843 A | | 11/1999 | Silversand |
| 6,123,873 A | * | 9/2000 | Primdahl ..................... 252/373 |
| 6,132,157 A | | 10/2000 | Comardo |
| 6,224,789 B1 | * | 5/2001 | Dybkjaer ..................... 252/373 |

FOREIGN PATENT DOCUMENTS

DE 1542473 3/1970

OTHER PUBLICATIONS

Christoffel, EG, "Laboratory Reactors and Heterogeneous Catalytic Processes," *Catal. Rev.—Sci. Eng.* vol. 24, p. 159 (1982).

Richardson, James T., *Principles of Catalyst Development*, pp. 8 and 25, Plenum Press, New York, NY (1989).

Freni S et al: "Hydrogen production from methane through catalytic partial oxidation reactions". Journal of Power Sources, Elsevier Sequoia S.A. Lausanne, CH, vol. 87, No. 1–2, (Apr. 2000), pp. 28–38, EX004194181, ISSN: 0378–7753 *the whole document* .

* cited by examiner

*Primary Examiner*—Wayne A. Langel
(74) *Attorney, Agent, or Firm*—Kellogg Brown & Root, Inc.

(57) ABSTRACT

Syngas production process and reforming exchanger. The process involves passing a first portion of hydrocarbon feed mixed with steam and oxidant through an autothermal catalytic steam reforming zone to form a first reformed gas of reduced hydrocarbon content, passing a second portion of the hydrocarbon feed mixed with steam through an endothermic catalytic steam reforming zone to form a second reformed gas of reduced hydrocarbon content, and mixing the first and second reformed gases and passing the resulting gas mixture through a heat exchange zone for cooling the gas mixture and thereby supplying heat to the endothermic catalytic steam reforming zone. The endothermic catalytic steam reforming zone and the heat exchange zone are respectively disposed tube side and shell side within a shell-and-tube reforming exchanger. The reforming exchanger comprises a plurality of tubes packed with low pressure drop catalyst-bearing monolithic structures wherein an inside diameter of the tubes is less than 4 times a maximum edge dimension of the catalyst structures.

28 Claims, 4 Drawing Sheets

LOW PRESSURE DROP REFORMING EXCHANGER

FIELD OF THE INVENTION

This invention relates to reforming exchangers for syngas production, and more particularly to reforming exchangers with catalyst tubes having a relatively low ratio of inside tube diameter to catalyst particle size.

BACKGROUND OF THE INVENTION

Steam reforming of a hydrocarbon to manufacture syngas is a very well known process. One popular technique is to use an autothermal reformer in conjunction with a reforming exchanger, as described in U.S. Pat. No. 5,011,625 to Le Blanc, which is hereby incorporated by reference herein in its entirety. Briefly, the hydrocarbon and an oxygen source are supplied to the autothermal reformer. The combustion reaction is exothermic and supplies the heat needed for the catalytic reforming reaction that occurs in the autothermal reformer, which is endothermic, to produce a relatively hot reformed gas. The hot gas from the autothermal reformer is then used as a heat source in the reforming exchanger, which is operated as an endothermic catalytic steam reforming zone. In the reforming exchanger, a feed comprising a mixture of steam and hydrocarbon is passed through catalyst-filled tubes. The outlet ends of the tubes discharge the endothermically reformed gas near the shell side inlet where it mixes with the hot gas from the autothermal reformer. The hot gas mixture is then passed countercurrently across the tubes in indirect heat exchange to supply the heat necessary for the endothermic reforming reaction to occur.

Reforming exchangers are in use commercially and are available, for example, from Kellogg Brown & Root, Inc. under the trade designation KRES. Various improvements to the reforming exchanger design have been made, as disclosed in, for example, U.S. Pat. No. 5,362,454 to Cizmar et al., which is hereby incorporated by reference herein in its entirety.

The present invention addresses improvements to the basic reforming exchanger design. The primary design consideration is to minimize the capital cost of the equipment, which is complicated because expensive alloys must be used to construct the tube bundle and tube sheets for the relatively high operating temperatures and pressures. Another design consideration is to maximize the capacity of the reforming exchanger within the practical limits of fabrication capabilities. It is also desirable to minimize the size and weight of the reforming exchanger to facilitate maintenance operations that require removal of the tube bundle.

Our approach to reducing the capital cost and increasing the capacity of the reforming exchanger is to increase the heat transfer rate by increasing the surface area available for heat transfer. Increasing the length of the conventional catalyst-filled tubes in the existing reforming exchanger design, however, was not practical because the tube side pressure drop ($\Delta P$) would increase beyond that permitted without unduly complicating the tube sheet and tube sheet support designs, as well as increasing upstream operating pressures and compression costs. Furthermore, longer tubes would complicate the maintenance operations involving removal of the tube bundle.

The other approach to increasing the heat transfer area is to reduce the diameter of the catalyst-filled tubes. However, it was a commonly held belief among the reforming reactor designers that the inside diameter of the heat transfer tubes had to be a minimum of 5 times the diameter or other largest edge dimension of the catalyst particles, supposedly because of packing, bridging, flow channeling, and other potential problems. For example, James T. Richardson, *Principles of Catalyst Development*, Plenum Press, New York, N.Y., p. 8 (1986) (citing E. G. Christoffel, "Laboratory Reactors and Heterogeneous Catalytic Processes," *Catal. Rev.—Sci. Eng.*, vol. 24, p. 159 (1982)), reports that the reactor to particle diameter ratio should be from five to ten, with the reactor length at least 50–100 times the particle diameter, to ensure that the flow is turbulent, uniform, and approximately plug flow.

To observe these design criteria would mean that reducing the tube diameter and increasing the number of tubes, as a means of increasing the available surface area, would require using a smaller catalyst structure. For example, in tubes having a 2-in. inside diameter (ID), the longitudinally bored, cylindrical catalyst shapes, also known as Raschig rings, prevalent in reforming exchangers used in the art would typically measure 0.315-in. outside diameter (OD) by 0.125-in. ID by 0.31-in. long. When small-ID tubes were specified, it was thought that the size of the catalyst particles had to be correspondingly reduced to adhere to the traditional equation $D_t/D_p > 5$, wherein $D_t$ is the inside diameter of the tubes in the reforming exchanger and $D_p$ is the maximum edge dimension of the catalyst structure. Unfortunately, the use of smaller catalyst particles in smaller tubes, to observe this conventional design criterion, resulted in an unacceptable increase in tube side pressure drop. Conversely, because existing reforming exchanger designs were already at or near the maximum ratio of catalyst size to tube ID, the catalyst size could not be increased in the existing tube design as a means for reducing the pressure drop per unit of tube length so as to allow the use of longer tubes. It appeared as if there would be no practical way to increase the heat transfer, and that the ultimate capacity limits of the reforming exchanger design had been reached.

SUMMARY OF THE INVENTION

In the investigation of the present reforming exchanger designs, it was observed that the endothermic catalytic reforming reaction in the reforming exchanger is limited by heat transfer and not limited by catalyst activity. In other words, increasing the heat transfer between the shell side and tube side fluids in the reforming exchanger would tend to increase the rate of reaction, whereas increasing or decreasing the catalyst activity or surface area would have less effect on the reaction rate. With this observation, the present applicants are able to increase the heat transfer coefficients by using catalyst that has a relatively low tube side pressure drop ($\Delta P$), but does not necessarily have an equivalent catalytic activity or geometric surface area. Further, the present applicants discovered that by carefully packing the tubes with the catalyst particles, the conventional design relationship between the catalyst diameter, $D_p$, and the tube inside diameter, $D_t$, is not applicable, and that a $D_t/D_p$ ratio of preferably less than 4, and more preferably 3 or less, is employed to reduce the pressure drop in smaller inside diameter (ID) tubes. Quite surprisingly, the present applicants also discovered that the use of smaller ID tubes with a smaller $D_t/D_p$ ratio results in higher heat transfer coefficients and greater efficiency than tubes designed with a conventional $D_t/D_p$ ratio.

The present invention thus provides a solution to the dilemma in the prior art reforming exchanger designs. The present invention is the discovery of a tube design in a syngas reforming exchanger employing a catalyst structure and/or arrangement that allows the use of relatively long and/or relatively small-ID tubes. The catalyst-packed tubes can have a lower $D_t/D_p$ ratio than in the prior art reforming exchangers. This allows the capacity of the reforming exchanger to be increased for a given size. Alternatively or additionally, the size and cost of the reforming exchanger for a given syngas production capacity can be significantly reduced.

In one aspect, the invention provides a syngas production process comprising: (1) passing a first portion of a hydrocarbon feed mixed with steam and oxidant through an autothermal catalytic steam reforming zone to form a first reformed gas of reduced hydrocarbon content; (2) passing a second portion of the hydrocarbon feed mixed with steam through an endothermic catalytic steam reforming zone to form a second reformed gas of reduced hydrocarbon content; (3) mixing the first and second reformed gases and passing the resulting gas mixture through a heat exchange zone for cooling the gas mixture and supplying heat to the endothermic catalytic steam reforming zone; (4) wherein the endothermic catalytic steam reforming zone and the heat exchange zone are respectively disposed tube side and shell side within a shell-and-tube reforming exchanger comprising a plurality of tubes packed with catalyst-bearing monolithic structures, wherein $D_t/D_p$ is not more than 4, wherein $D_t$ is the inside diameter of the tubes and $D_p$ is a maximum edge dimension of the catalyst structures; and (5) recovering syngas comprising the cooled gas mixture.

In another aspect, the invention provides apparatus for reforming a hydrocarbon to produce syngas. The apparatus includes means for passing a first portion of a hydrocarbon feed mixed with steam and oxidant through an autothermal catalytic steam reforming zone to form a first reformed gas of reduced hydrocarbon content. Means are provided for passing a second portion of the hydrocarbon feed mixed with steam through an endothermic catalytic steam reforming zone to form a second reformed gas of reduced hydrocarbon content. Means are also provided for mixing the first and second reformed gases and passing the resulting gas mixture through a heat exchange zone for cooling the gas mixture and supplying heat to the endothermic catalytic steam reforming zone. The endothermic catalytic steam reforming zone and the heat exchange zone are respectively disposed tube side and shell side within a shell-and-tube reforming exchanger comprising a plurality of tubes packed with catalyst-bearing monolithic structures. The tubes have an inside diameter that is not more than 4 times a maximum edge dimension of the catalyst structures. Means are further provided for recovering syngas comprising the cooled gas mixture.

In a further aspect, the invention provides a syngas reforming exchanger. The exchanger has a tube side fluid inlet, a shell side fluid inlet and outlet, and an elongated shell having relatively high and low temperature ends. The shell side fluid inlet is adjacent to the high temperature end for receiving a hot gas feed. The tube side fluid inlet is adjacent to the low temperature end for receiving a feed mixture of hydrocarbon and steam. The shell side fluid outlet is fluidly isolated from the tube side fluid inlet by a tube sheet that is adjacent to the low temperature end for discharging cooled gas from the reforming exchanger. A tube bundle is made up of a plurality of tubes and one or more longitudinally spaced transverse baffle plates. The tubes have an inlet end secured to the tube sheet for receiving the feed mixture and an outlet end that is adjacent to the shell side fluid inlet for discharging reformed gas into the hot gas feed. Catalyst-bearing monolithic structures are disposed within the tubes for converting the gas feed mixture to reformed gas. The tubes have an inside diameter that is not more than 4 times a maximum edge dimension of the catalyst structures.

In the process, apparatus and reforming exchanger, the tubes preferably have an $L_t/D_t$ ratio of at least 300, wherein $L_t$ is the length of the catalyst packing in the tubes. The combination of the tube ID and the catalyst-bearing monolithic structures preferably results in a higher heat transfer rate for the same given pressure drop, i.e. wherein an overall heat transfer rate is at least 5 percent greater for a given pressure drop than Raschig rings measuring 0.31-in. long by 0.31-in. outside diameter by 0.125-in. inside diameter in tubes having an inside diameter of 2-in.

The catalyst-bearing monolithic structures, in one embodiment, comprise a twisted tape insert. The twisted tape insert is preferably made of nickel or a nickel alloy, and can have a wash-coated surface impregnated with a nickel-containing catalyst. The twisted tape insert can have a length that is coextensive with the catalyst-packed length of the tubes and an OD that is about equal to the tube ID, such that $D_t/D_p$ is substantially less than 1, taking the length of the twisted tape insert as the longest edge dimension for $D_p$ as defined above.

In another embodiment, the catalyst-bearing monolithic structures comprise a central longitudinal runner and a plurality of bristles extending transversely therefrom. The bristles can be wash-coated and impregnated with a nickel-containing catalyst. Again, the runner can have a length that is coextensive with the catalyst-packed length of the tubes and an OD that is about equal to the tube ID, such that $D_t/D_p$ is substantially less than 1, again taking the length of the runner as the longest edge dimension for $D_p$ as defined above.

In a further embodiment, the catalyst-bearing monolithic structures comprise ceramic foam. The ceramic foam can be made by filling voids in an organic sponge substrate with a fluidized ceramic precursor and burning the substrate away to form the ceramic foam. The ceramic foam can be impregnated with nickel or another catalytically active material, and is preferably made in sheets, plugs are cut from the sheets having a diameter less than a thickness, and a plurality of the plugs are stacked end-to-end in each tube. The ceramic foam plugs preferably have a length or height that is about equal to or greater than the ID of the tubes and an OD that is about equal to the tube ID, such that $D_t/D_p$ is approximately 1.

Still further, in another embodiment, the catalyst-bearing monolithic structures comprise finned, hollow cylinders, also called ribbed rings. The ribbed rings preferably have a longitudinal bore formed along a central axis. The depth of channels between the fins, i.e. the radial height of the fins, is preferably from 0.1 to 0.3 times the outside diameter (OD) of the structures, measuring to an outer diameter of the fins. The ribbed rings can have a length that is roughly ⅓ to ¼ the tube ID, such that $D_t/D_p$ is from about 3 to about 4.

DESCRIPTION OF THE INVENTION

Figure 1:
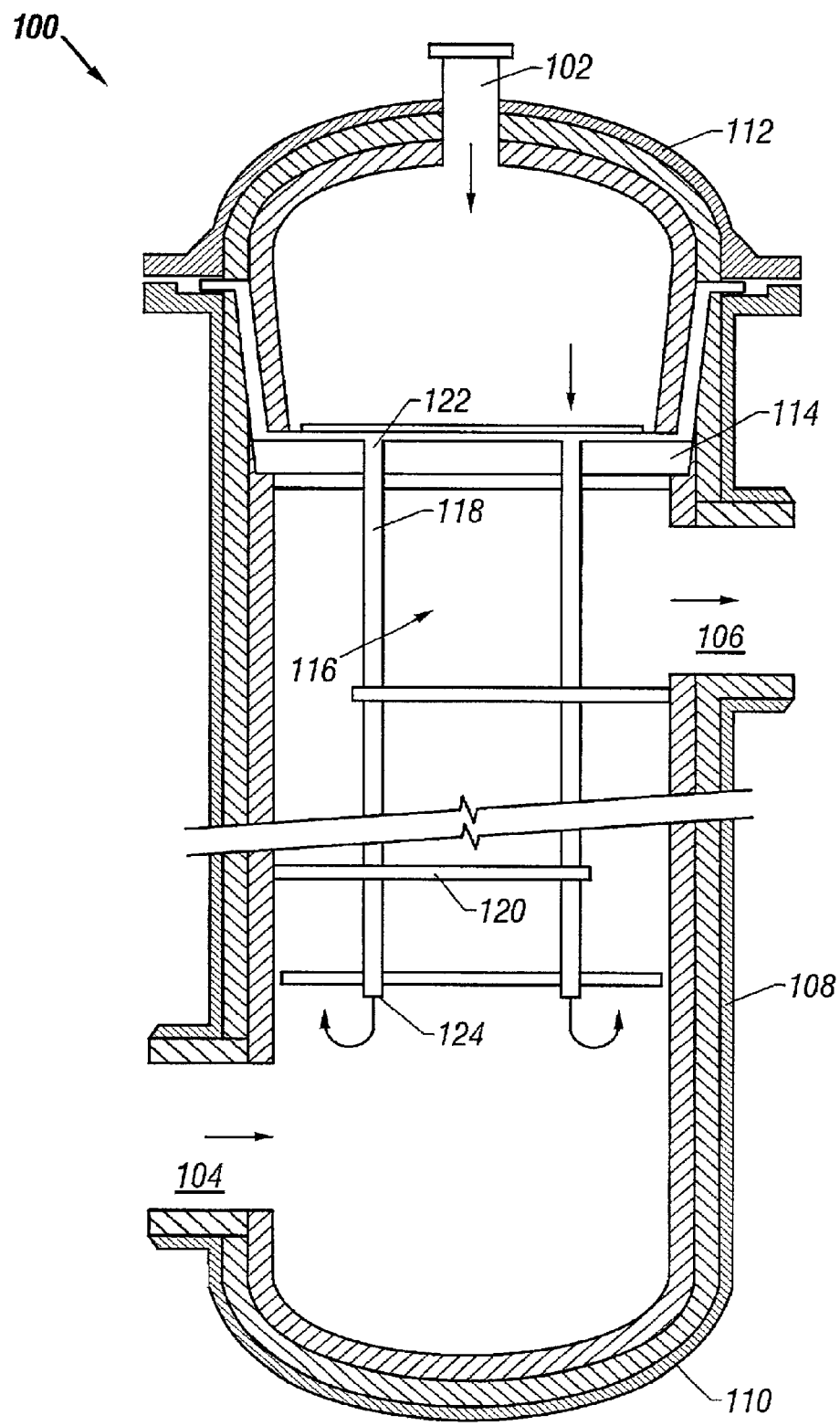
FIG. 1 is a schematic view of a reforming exchanger.

Referring to FIG. 1, there is shown a reforming exchanger 100 generally built according to the disclosures in the LeBlanc and Cizmar et al. patents mentioned above, and also incorporating the principles of the present invention. The reforming exchanger 100 has a tube side fluid inlet 102, shell side fluid inlet 104, and shell side fluid outlet 106 in an elongated shell 108 having respective relatively high and low temperature ends 110 and 112, respectively. The shell side fluid inlet 104 is adjacent to the high temperature end 110 for receiving a hot gas feed. The tube side fluid inlet 102 is adjacent to the low temperature end 112 for receiving a feed mixture of hydrocarbon and steam. The shell side fluid outlet 106 is fluidly isolated from the tube side fluid inlet 102 by tube sheet 114 that is adjacent to the low temperature end 112 for discharging cooled gas from the reforming exchanger 100.

A tube bundle 116 is made up of a plurality of tubes 118 and one or more longitudinally spaced transverse baffle plates 120. The tubes 118 have an inlet end 122 secured to the tube sheet 114 for receiving the gas mixture, and an outlet end 124 that is adjacent to the shell side fluid inlet 104 for discharging reformed gas into the hot gas feed. Low pressure drop ($\Delta P$) catalyst-bearing monolithic structures (see FIGS. 2–7) are disposed within the tubes for converting the gas feed mixture to reformed gas.

The tubes 118 preferably have a ratio of $L_t/D_t$ of at least 300, more preferably at least 450–500. In determining $L_t/D_t$, the diameter $D_t$ refers to the inside diameter of the tubes 118 in the case of right circular cylindrical tubes, or to the equivalent hydraulic diameter in the case of non-circular tubes. The length $L_t$ refers to the catalyst-filled or -packed length. Higher $L_t/D_t$ ratios are preferred in the present invention because the heat transfer coefficients are generally higher than with a lower $L_t/D_t$ ratio, and the resulting equipment cost is lower. A longer, smaller-ID catalyst tube 118 generally results in more tubes 118 in the tube bundle 116, but the tube bundle 116 has a smaller diameter for a given conversion capacity, allowing the use of a shell 108 that has a smaller diameter. In general, the reduction of the diameter of the shell 108 and tube bundle 116 results in more capital cost savings than result from any increase in the length thereof, and thus the reforming exchanger 100 of the present invention can be much cheaper to fabricate than a prior art reforming exchanger of equivalent capacity. This result is particularly advantageous in the design of a new reforming exchanger 100.

Or, if it is desired to use the same shell diameters and tube lengths of a prior art reforming exchanger so that the capital costs thereof are substantially equivalent, then the conversion capacity of the reforming exchanger 100 is substantially increased. This latter result is particularly advantageous in the retrofitting of existing reforming exchangers by replacing the existing tube bundle with a tube bundle 116 that has relatively more smaller-ID tubes 118 so that the retrofitted reforming exchanger 100 has a higher capacity than the original reforming exchanger.

In the present invention, the ratio of the tube inside diameter (ID), $D_t$, to the largest edge dimension of the catalyst structure ($D_p$) can be relatively small compared to the same ratio in conventional reforming exchangers. For example, in prior art reforming exchangers employing Raschig ring catalyst measuring 0.31-in. OD by 0.125-in. ID by 0.31-in. long, the minimum tube ID was about 2 inches. In the present invention, the same Raschig ring catalyst can be used in approximately 1.25-in. or even 1-in. ID tubes with an equivalent or slightly higher ratio of heat transfer to pressure drop. In the present invention, the $D_t/D_p$ ratio is preferably not more than 4, and more preferably about 3 or less.

A low $\Delta P$ catalyst structure is defined herein as any suitable catalyst structure that results in a higher rate of heat transfer per unit of tube side pressure drop than in 2-in. ID reforming exchanger tubes filled with catalyst-supporting Raschig rings measuring 0.31-in. OD by 0.125-in. ID by 0.31-in. long under similar operating conditions and conversions.

Several different types of low $\Delta P$ monolithic catalyst support structures are contemplated as being useful in the present invention. While the low $\Delta P$ is the most important property in the present invention, the exemplary catalysts are also typically found to have a relatively high void fraction and present a tortuous flow path to the tube side fluid. Catalyst activity can be relatively low to moderate without significant reduction in conversion rates, although there is no general detriment to using a high activity catalyst aside from the typically higher cost involved.

Figure 2A:
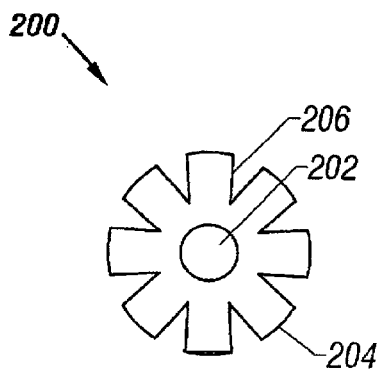
FIGS. 2A and 2B are end and perspective views, respectively, of a ribbed ring catalyst support according to one embodiment of the invention.
Figure 2B:
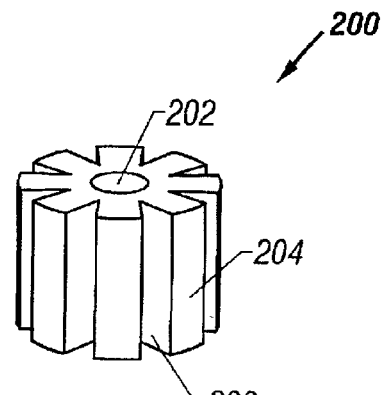
Figure 3:
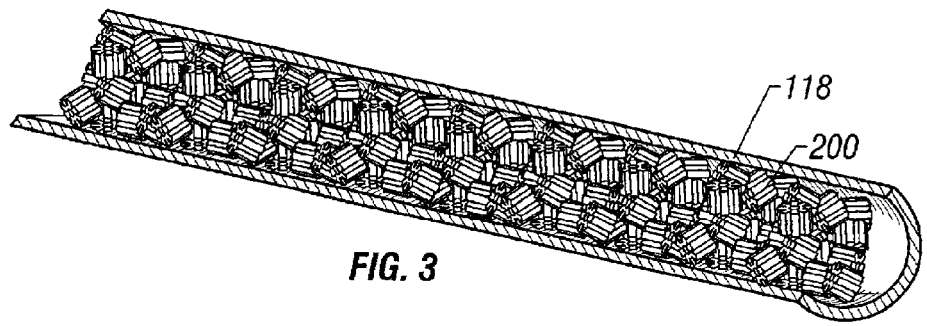
FIG. 3 is a perspective view, partially cut away, of the ribbed ring catalyst support of FIGS. 2A and 2B packed in a tube of the reforming exchanger according to the invention.

With reference to FIGS. 2A, 2B and 3, the catalyst support 200 is a ribbed ring catalyst structure comprising an overall cylindrical shape with a central longitudinal bore 202 and exterior ribs 204 running parallel to a longitudinal axis. The depth of the V-shaped channel 206 between the ribs is preferably from 0.1 to 0.3 times the OD of the support 200. Supports 200 measuring 2.362-in. (6 mm) OD by 0.787-in. (2 mm) ID by 2.362-in. (6 mm) long with a fin 204 height of 0.787-in. (2 mm) comprise one example of a suitably dimensioned support 200 for use in nominal 1-inch or 1.5-inch tubes.

The ribbed ring supports 200 can be made by pressing a ceramic precursor into molds with a pin to make the central bore 202, followed by calcining the material at elevated temperatures, e.g. 2500° F., to form a ribbed ring support made of an α-alumina, for example, and impregnating the α-alumina with nickel or another suitable catalytically active material. Ribbed ring catalyst is commercially available, for example, from Süd-Chemie Inc. of Louisville, Ky. Because of the relatively large size of the ribbed ring catalyst compared to the tube 118 ID, the catalyst should preferably be loaded into the tubes 118 using a dense loading method such as is accomplished with the equipment and methodology described in U.S. Pat. Nos. 6,132,157, 5,897,282, and 5,890,868, which are hereby incorporated herein by reference, in order to minimize any packing or bridging problems.

Figure 4:
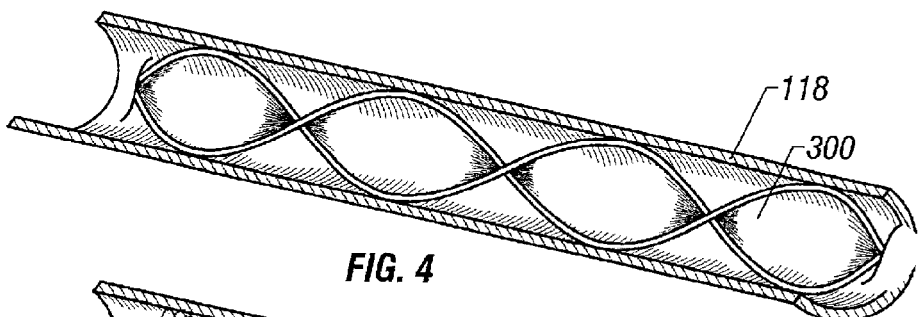
FIG. 4 is a perspective view, partially cut away, of a twisted tape catalyst monolith insert in a tube of the reforming exchanger according to another embodiment of the invention.

With reference to FIG. 4, the catalyst insert 300 is in the form of a twisted tape having an OD about the same as the ID of the tube 118 in which it is used. The OD of the insert 300 is slightly less than the ID of the tube 118 to facilitate placement of the tape insert 300. The length of the insert 300 can be essentially the same length as the tube with one insert 300 in each tube 118, or multiple inserts 300 can be placed end-to-end in each tube 118. For the multiple inserts 300, each insert 300 preferably has a length which is at least as great as the diameter in order to keep the inserts 300 longitudinally aligned in the tube 118. The insert 300 can be made of a catalytically active material such as nickel, or it can be coated with a catalytically active material. For example, the insert 300 can be wash coated with a ceramic as described in U.S. Pat. No. 5,980,843 to Silversand or U.S. Pat. No. 5,935,889 to Murrell et al., both of which are hereby incorporated herein by reference in their entireties, and the ceramic coating impregnated with a nickel catalyst by conventional ceramic impregnation techniques. Catalytically inactive forms of such inserts 300 are commercially available for increasing the tube side heat transfer coefficients in a shell-and-tube heat exchanger from, for example, the Brown Fintube Company of Houston, Tex.

Figure 5:
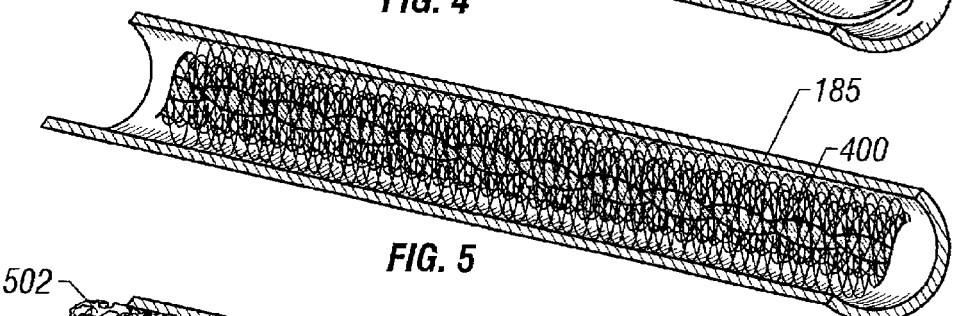
FIG. 5 is a perspective view, partially cut away, of a brush catalyst monolith insert in a tube of the reforming exchanger according to a further embodiment of the invention.

With reference to FIG. 5, the catalyst insert 400 is in the form of a brush comprising a central runner 402 and a plurality of bristles or filaments 404 extending transversely therefrom. The brush insert 400 has an OD about the same as the ID of the tube 118 in which it is used. The length of the insert 400 can be essentially the same length as the tube 118 with one insert 400 in each tube 118, or multiple inserts 400 can be placed end-to-end in each tube 118, optionally with some overlap. For the multiple inserts 400, each insert 400 should have a length which is at least several times as great as the diameter in order to keep the inserts 400 longitudinally aligned in the tube 118. The insert 400 can be made of a catalytically active material such as nickel, or it can be coated with a catalytically active material. For example, the insert 400 can be wash coated with a ceramic as described above, and the ceramic coating impregnated with a nickel catalyst by conventional ceramic impregnation techniques. Catalytically inactive forms of such inserts 400 are commercially available for increasing the tube side heat transfer coefficients in a shell-and-tube heat exchanger under, for example, the trade designation HITRAN.

Figure 7:
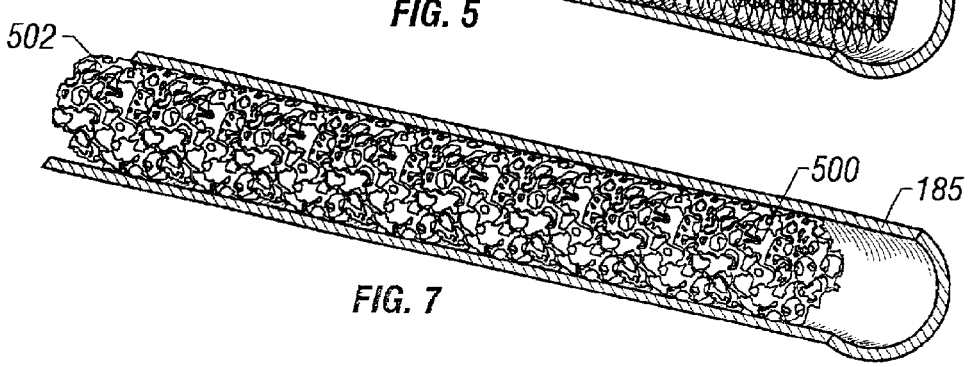
FIG. 7 is a perspective view, partially cut away, of the ceramic foam catalyst support of FIGS. 6A and 6B packed in a tube of the reforming exchanger according to the invention.
Figure 6A:
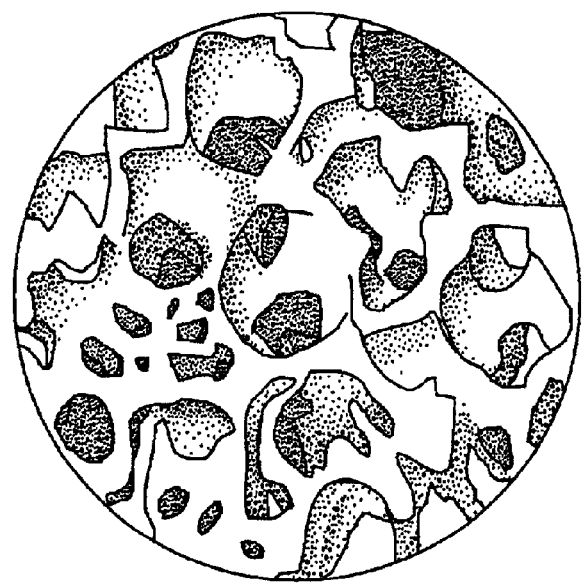
FIGS. 6A and 6B are end and perspective views, respectively, of a plug-shaped ceramic foam catalyst support according to another embodiment of the invention.
Figure 6B:
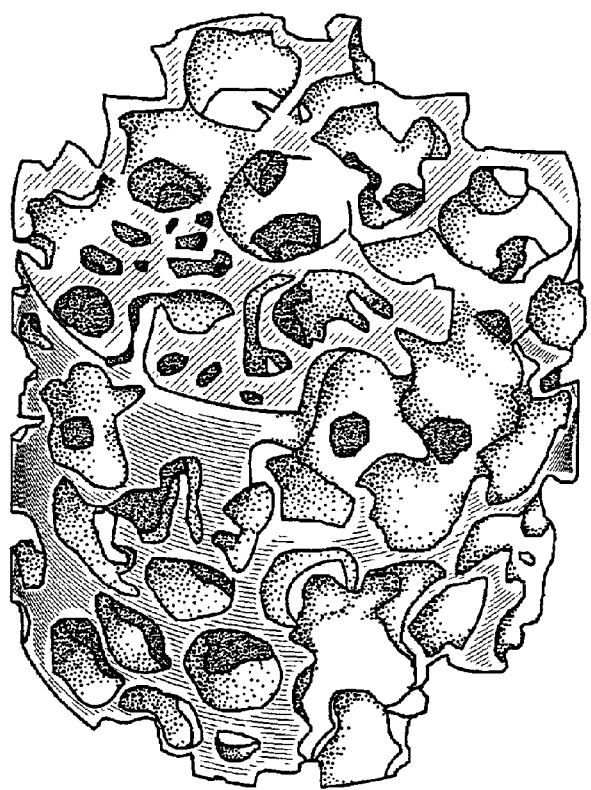

With reference to FIGS. 6A, 6B and 7, the catalyst insert 500 is in the form of a ceramic foam. The ceramic foam insert 500 is preferably made by filling voids in an organic sponge substrate with a fluidized ceramic precursor and burning the substrate away to form the ceramic foam. The ceramic foam can be impregnated with nickel or another catalytically active material using conventional nickel impregnation techniques. The ceramic foam insert 500 is preferably made in sheets, plugs 502 are cut from the sheets having a diameter less than a thickness, and a plurality of the plugs 502 are stacked end-to-end in each tube 118. If necessary, the sheet can be filled with liquid wax, which is solidified to facilitate the cutting of the plugs 502, and then the wax is removed by melting it. The plug 502 has an OD about the same as the ID of the tube 118 in which it is used. The length of each plug 502 should be at least as great as the ID of the tube 118 to help keep the plug 502 aligned inside the tube 118. The plugs 502 are placed end-to-end in each tube 118 as illustrated in FIG. 7.

EXAMPLES

In the following examples, the tube side heat transfer coefficients, flow rates and pressure drops are based on a tube side inlet gas having the composition in Table 1:

TABLE 1

| Component | Mole Percent |
|---|---|
| $N_2$ | 0.23 |
| $H_2$ | 0.34 |
| $CH_4$ | 15.49 |
| Ar | <0.01 |
| $CO_2$ | 0.03 |
| $C_2H_6$ | 1.03 |
| $C_3H_8$ | 0.34 |
| $iC_4H_{10}$ | 0.10 |
| $iC_5H_{12}$ | 0.02 |
| $nC_6$ | 0.02 |
| CO | 0.00 |
| $H_2O$ | 82.40 |
| Total | 100.00 |

Examples 1–2

Conceptual sizing reviews were done on various types of catalyst sizes and tube inserts. The catalyst was of a normal size currently used in reforming exchangers available from Kellogg Brown & Root, Inc. under the trade designation KRES (Raschig rings 0.31-in. OD by 0.125-in. ID by 0.31-in. long), a smaller catalyst size (Raschig rings 0.25-in. OD by 0.10-in. ID by 0.25-in. long), a smallest catalyst size (Raschig rings 0.185-in. OD by 0.07-in. ID by 0.185-in. long), a twisted tape insert such as a Turbulator available from Brown Fintube but made of nickel 201 (99.6% nickel), and a ceramic foam insert impregnated with nickel. The results are summarized in Table 2:

TABLE 2

| Parameter | Base Case | Comparative Example A | Comparative Example B | Comparative Example C | Example 1 | Example 2 |
|---|---|---|---|---|---|---|
| Catalyst | Normal (0.31 × 0.125 × 0.31) | Smaller (0.25 × 0.10 × 0.25) | Smallest (0.185 × 0.07 × 0.185) | Solid Pellets (0.185 × 0.185) | Twisted tape | Ceramic foam |
| Refractory ID (in.) | 103 | 114 | 110 | 120 | 48 | 88 |
| Tube length (ft) | 44 | 44 | 27 | 24 | 60 | 41 |
| Tube OD (in.) | 2 | 2.5 | 1.5 | 1.5 | 0.75 | 1.15 |
| Relative no. of tubes | Base | 0.79 | 2.03 | 2.33 | 1.61 | 1.62 |

TABLE 2-continued

| Parameter | Base Case | Comparative Example A | Comparative Example B | Comparative Example C | Example 1 | Example 2 |
|---|---|---|---|---|---|---|
| Relative surface area | Base | 0.986 | 0.936 | 0.954 | 0.822 | 0.833 |
| Tube ΔP (psi) | 28 | 29 | 28 | 27 | 10 | 29 |
| Shell side ΔP (psi) | 8 | 8 | 8 | 8 | 8 | 8 |
| MTD (° F.) | 145.5 | 153.2 | 140.7 | 135.9 | 139.8 | 150 |
| Overall U (Btu/hr-ft$^2$-° F.) | 55.7 | 53.4 | 63.8 | 65.3 | 68.3 | 60.0 |
| Approach to equilibrium (° F.) | 3.6 | 3.4 | 5.1 | 5.9 | 5.1 | 5.3 |
| Estimated cost (relative) | Base | 1.06 | 0.96 | 0.99 | 0.37 | 0.48 |

These results show little or no advantage in the use of the smaller or smallest drilled cylinder catalyst shapes, or solid cylindrical pellets, Comparative Examples A, B and C, respectively. The smaller catalyst sizes result in larger diameter reactors (refractory ID), assuming that the same allowable pressure drop is available, as in Comparative Examples A, B and C. Although the tube lengths are shorter in Comparative Examples B and C, the larger reactor diameters result in premium costs and also present problems in tubesheet fabrication and quality control.

The designs with the twisted tape insert and the ceramic foam (Examples 1 and 2) use smaller diameter tubes and lattice or egg crate type baffles, resulting in longitudinal shell side flow and improved shell side performance. Combined with the enhanced tube side performance, this results in a more cost effective design with a lower pressure drop. Example 1 is based on the twisted insert measuring 0.625-in. wide by 0.035-in. thick and twisted to 4 revolutions per foot. Performance sizing assumed the same targeted methane slip (2.5%) and the same activity factors as with conventional catalysts. Nickel impregnation of a ceramic coating on the twisted tape insert can improve catalytic activity.

Example 3

Conceptual sizing reviews were done as in Examples 1-2 to compare the pressure drop and performance of Raschig ring catalyst against ribbed ring catalyst. Both catalyst structures measured 0.31-in. OD by 0.125-in. ID by 0.31-in. long, and the V-shaped grooves between the ribs on the ribbed ring catalyst were 0.17-in. deep. The results are presented in Table 3:

TABLE 3

| Parameter | Comparative Example D | Example 3 |
|---|---|---|
| Catalyst | 0.31 in. × 0.125 in. × 0.31 in. Raschig rings | 0.31 in. × 0.125 in. × 0.31 in. ribbed rings |
| Refractory ID (in.) | 55 | 55 |
| Tube length (ft) | 25 | 25 |
| Tube ID (in.) | 2.00 | 2.00 |
| Tube OD (in.) | 2.25 | 2.25 |
| Relative no. of tubes | Base | 1.0 |
| Relative catalyst volume | Base | 1.0 |
| Relative surface area | Base | 1.0 |
| Tube ΔP (psi) | 21.5 | 12.5 |
| Shell side ΔP (psi) | 8 | 8 |
| MTD (° F.) | 211 | 225 |
| Overall U (Btu/hr-ft$^2$-° F.) | 51 | 48 |
| Approach to equilibrium (° F.) | 33.4 | 29.1 |
| Methane slip (%) | 1.19 | 1.16 |

The data for Example 3 demonstrate that the performance of the ribbed ring catalyst is generally equivalent to Raschig rings of the same size, except that the tube side pressure drop is substantially lower. The cost of the ribbed ring reforming exchanger with a correspondingly reduced number of relatively longer tubes would be much less since exchanger overall length is generally less expensive than exchanger diameter.

Examples 4-5

Conceptual sizing reviews were done as in Examples 1-3 for various sizes of catalyst tube ID's (2.0, 1.55 and 1.00-in.) using standard Raschig ring catalyst. The results are presented in Table 4:

TABLE 4

| Parameter | Comparative Example D | Example 4 | Example 5 |
|---|---|---|---|
| Catalyst | 0.31 in. × 0.125 in. × 0.31 in. Raschig rings | 0.31 in. × 0.125 in. × 0.31 in. Raschig rings | 0.31 in. × 0.125 in. × 0.31 in. Raschig rings |
| Refractory ID (in.) | 91.3 | 84.6 | 81.9 |
| Tube length (ft) | 40 | 35 | 25 |
| Tube ID (in.) | 2.00 | 1.55 | 1.00 |
| Tube OD (in.) | 2.25 | 1.75 | 1.125 |
| Relative no. of tubes | Base | 1.43 | 2.91 |
| Relative catalyst volume | Base | 0.75 | 0.45 |
| Relative surface area | Base | 0.964 | 0.912 |
| Tube ΔP (psi) | 35.5 | 34.5 | 33.8 |
| MTD (° F.) | 167.9 | 157.9 | 150.2 |
| Overall U (Btu/hr-ft$^2$-° F.) | 64.7 | 71.4 | 79.9 |

TABLE 4-continued

| Parameter | Comparative Example D | Example 4 | Example 5 |
|---|---|---|---|
| Approach to equilibrium (° F.) | 6.9 | 8.4 | 14.9 |
| Estimated cost (relative) | Base | 0.84 | 0.64 |

The data for Examples 4 and 5 show, quite surprisingly, that employing smaller tubes, i.e. a lower $D_t/D_p$ ratio, using the conventional Raschig rings, has the result of significantly reducing the catalyst volume and cost of the reforming exchanger, while maintaining the same capacity.

Example 6

Figure 8:
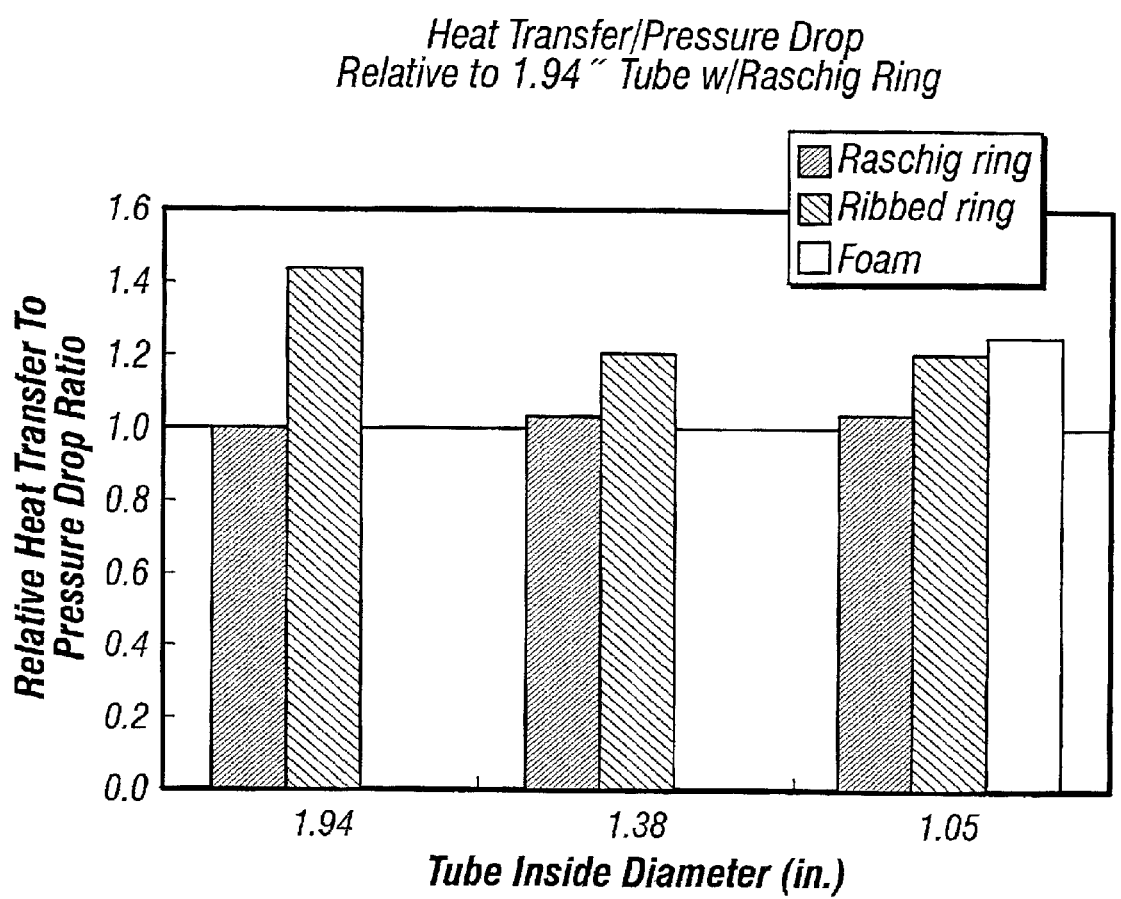
FIG. 8 is a bar chart comparing the heat transfer/pressure drop ratio for ribbed ring, Raschig ring and foam catalyst supports in 1.38-in. or 1.05-in. inside diameter (ID) tubes, and for ribbed rings in a 1.94-in. ID tube, in a reforming exchanger, relative to Raschig rings in a 1.94-in. ID tube.

Tubes of various sizes were packed with catalyst shapes comprising Raschig rings, ribbed rings and ceramic foam plugs in a laboratory tube evaluation apparatus. Air was passed through the packed tubes at Reynold's numbers similar to those seen in commercial reforming reactor tubes. The tubes were externally heated to provide tube wall temperatures within a range expected in commercial reforming reactor tubes. Heat transfer coefficients (Btu/hr-ft²-° F.) for the inside surface of the tubes were determined and pressure drop (psi/ft) was measured. The data were used to compare the ratio of heat transfer to pressure drop relative to a 1.94-in. ID tube with Raschig ring catalyst supports. The ratio was determined for Raschig rings and ribbed rings in 1.94-in. ID and 1.38-in. ID tubes, and for Raschig rings, ribbed rings and ceramic foam in 1.05-in. ID tubes. The results are presented in FIG. 8, and show that the relative ratio of heat transfer to tube side pressure drop is significantly higher for ribbed ring catalyst at all tube diameters, and for ceramic foam catalyst at the smaller tube diameter tested.

The foregoing description and examples of the invention are merely illustrative thereof. Various changes and modifications will be obvious to the skilled artisan in view of the foregoing disclosure. All such variations that fall within the scope or spirit of the appended claims are intended to be embraced thereby.

We claim:

1. A syngas production process, comprising:
    passing a first portion of a hydrocarbon feed mixed with steam and oxidant through an autothermal catalytic steam reforming zone to form a first reformed gas of reduced hydrocarbon content;
    passing a second portion of the hydrocarbon feed mixed with steam through an endothermic catalytic steam reforming zone to form a second reformed gas of reduced hydrocarbon content;
    mixing the first and second reformed gases and passing the resulting gas mixture through a heat exchange zone for cooling the gas mixture and supplying heat to the endothermic catalytic steam reforming zone;
    wherein the endothermic catalytic steam reforming zone and the heat exchange zone are respectively disposed tube side and shell side within a shell-and-tube reforming exchanger comprising a plurality of tubes packed with catalyst-bearing monolithic structures, the tubes having an inside diameter that is not more than 4 times a maximum edge dimension of the catalyst structures; and
    recovering syngas comprising the cooled gas mixture.

2. The process of claim 1 wherein the tubes have an $L_t/D_t$ ratio of at least 300 wherein $L_t$ is taken as the length of the catalyst bearing extent of the tubes and $D_t$ is the inside diameter of the tubes.

3. The process of claim 2 wherein an overall heat transfer rate is at least 5 percent greater for a given pressure drop than Raschig rings measuring 0.31-in. long by 0.31-in. outside diameter by 0.125-in. inside diameter in tubes having an inside diameter of 2-in.

4. The process of claim 3 wherein a surface area of the catalyst-bearing monolithic structures for a given capacity is less than the Raschig rings in the 2-in. inside diameter tubes.

5. The process of claim 4 wherein a catalyst volume of the catalyst-bearing monolithic structures for the given capacity is less than the Raschig rings in the 2-in. inside diameter tubes.

6. The process of claim 2 wherein the catalyst-bearing monolithic structures comprise ceramic foam made by filling voids in a sponge substrate with a fluidized ceramic and burning the substrate away to form the ceramic foam.

7. The process of claim 6 wherein the ceramic foam is made in sheets, plugs are cut from the sheet having a diameter less than a thickness, and a plurality of the plugs are stacked end-to-end in each tube.

8. The process of claim 2 wherein the catalyst-bearing monolithic structures comprise a twisted tape insert with a wash-coated surface impregnated with a nickel-containing catalyst.

9. The process of claim 2 wherein the catalyst-bearing monolithic structures comprise a central longitudinal runner, a plurality of bristles extending transversely therefrom and the bristles are wash-coated and impregnated with a nickel-containing catalyst.

10. The process of claim 1 wherein the catalyst-bearing monolithic structures comprise a twisted tape insert.

11. The process of claim 1 wherein the catalyst-bearing monolithic structures comprise a central longitudinal runner and a plurality of bristles extending transversely therefrom.

12. The process of claim 1 wherein the catalyst-bearing monolithic structures comprise ceramic foam.

13. The process of claim 1 wherein the catalyst-bearing monolithic structures comprise Raschig rings.

14. The process of claim 1 wherein the inside diameter of the tubes is from 0.75 to 1.55 inches.

15. Apparatus for reforming a hydrocarbon to produce syngas, comprising:
    means for passing a first portion of a hydrocarbon feed mixed with steam and oxidant through an autothermal catalytic steam reforming zone to form a first reformed gas of reduced hydrocarbon content;
    means for passing a second portion of the hydrocarbon feed mixed with steam through an endothermic catalytic steam reforming zone to form a second reformed gas of reduced hydrocarbon content;
    means for mixing the first and second reformed gases and passing the resulting gas mixture through a heat exchange zone for cooling the gas mixture and supplying heat to the endothermic catalytic steam reforming zone;
    wherein the endothermic catalytic steam reforming zone and the heat exchange zone are respectively disposed tube side and shell side within a shell-and-tube reforming exchanger comprising a plurality of tubes packed with catalyst-bearing monolithic structures, the tubes having an inside diameter that is not more than 4 times a maximum edge dimension of the catalyst structures; and means for recovering syngas comprising the cooled gas mixture.

16. The apparatus of claim 15 wherein the tubes have an $L_t/D_t$ ratio of at least 300 wherein $L_t$ is taken as the length of the catalyst bearing extent of the tubes and $D_t$ is the inside diameter of the tubes.

17. The apparatus of claim 16 wherein an overall heat transfer rate is at least 5 percent greater for a given pressure drop than Raschig rings measuring 0.31-in. long by 0.31-in. outside diameter by 0.125-in. inside diameter in tubes having an inside diameter of 2-in.

18. The apparatus of claim 17 wherein a surface area of the catalyst-bearing monolithic structures for a given capacity is less than the Raschig rings in the 2-in. inside diameter tubes.

19. The apparatus of claim 18 wherein a catalyst volume of the catalyst-bearing monolithic structures for the given capacity is less than the Raschig rings in the 2-in. inside diameter tubes.

20. The apparatus of claim 16 wherein the catalyst-bearing monolithic structures comprise ceramic foam made by filling voids in a sponge substrate with a fluidized ceramic and burning the substrate away to form the ceramic foam.

21. The apparatus of claim 20 wherein the ceramic foam is made in sheets, plugs are cut from the sheet having a diameter less than a thickness, and a plurality of the plugs are stacked end-to-end in each tube.

22. The apparatus of claim 16 wherein the catalyst-bearing monolithic structures comprise a twisted tape insert with a wash-coated surface impregnated with a nickel containing catalyst.

23. The apparatus of claim 16 wherein the catalyst-bearing monolithic structures comprise a central longitudinal runner, a plurality of bristles extending transversely therefrom and the bristles are wash-coated and impregnated with a nickel-containing catalyst.

24. The apparatus of claim 15 wherein the catalyst-bearing monolithic structures comprise a twisted tape insert.

25. The apparatus of claim 15 wherein the catalyst-bearing monolithic structures comprise a central longitudinal runner and a plurality of bristles extending transversely therefrom.

26. The apparatus of claim 15 wherein the catalyst-bearing monolithic structures comprise ceramic foam.

27. The apparatus of claim 15 wherein the catalyst-bearing monolithic structures comprise Raschig rings.

28. The apparatus of claim 15 wherein the inside diameter of the tubes is from 19 to 39 mm (0.75 to 1.55 inches).

* * * * *